Aug. 9, 1949.  E. HULL  2,478,195
COLLET ADAPTER
Filed Jan. 23, 1945
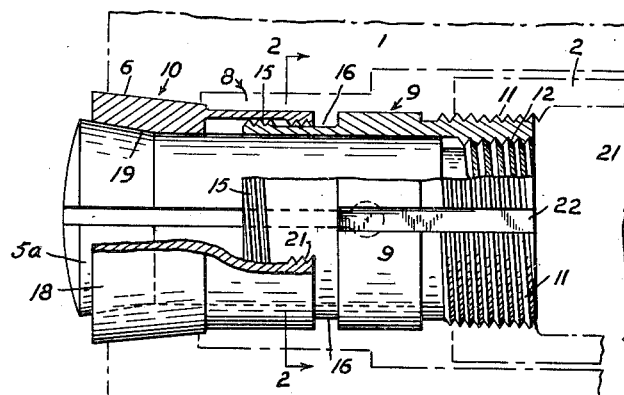
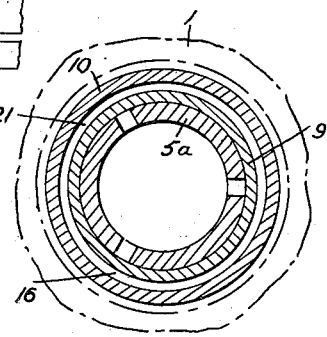
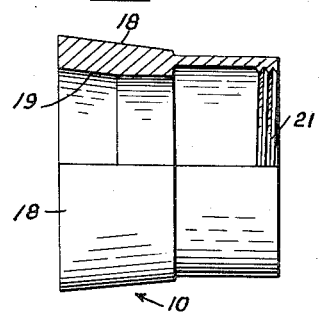
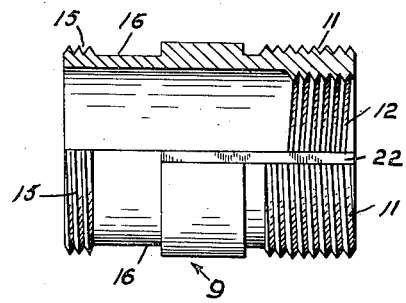
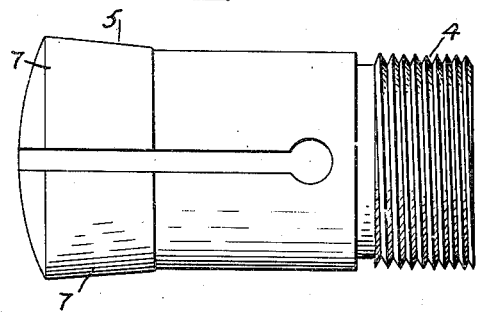
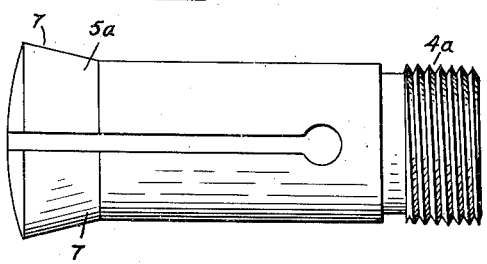
Inventor
Ernest Hull
By C. E. Herrstrom + W. E. Thibodeau
Attorneys Patented Aug. 9, 1949

2,478,195

UNITED STATES PATENT OFFICE 2,478,195

COLLET ADAPTER

Ernest Hull, Davenport, Iowa

Application January 23, 1945, Serial No. 574,169

7 Claims. (Cl. 279—1)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to the art of machine tools such as lathes and similar machines which are adapted to hold pieces of metal or other hard material while they are being turned, shaped, or otherwise processed by means of cutting tools pressed against said pieces.

More particularly the invention provides an improved attachment for such machines which substantially increases their usefulness and scope of operations and makes possible the processing in one machine of stock varying materially in sizes and dimensions in a manner heretofore unknown.

More specifically these results are obtained through the provision of an improved collet adapter by means of which collets so constructed as to receive only stock of relatively small diameters may be used in conjunction with the chuck or other holding member of a lathe or similar machine which normally functions only with collets adapted to hold stock of relatively large diameters.

Heretofore it has been a common practice in the art to provide each lathe and similar machine whether large or small with its own rack of collets of progressively varying sizes. In the case of relatively large collets the diameters of the stock they are adapted to retain or grip usually range from approximately ¼" to 1¼", the diameters being usually increased successively by sixteenths of an inch. For the small collets the diameter range usually is from about 1/64" to about 1", the graduations being generally by sixty-fourths of an inch. Since the larger collets usually differ in respect to the sizes of the stock they can grip or otherwise secure to a greater degree than do the relatively small collets, frequently the stock to be worked does not accurately fit any of the larger collets but does fit a small collet which, however, cannot be used in a lathe or similar machine adapted to receive only relatively large collets. The provision therefore of an attachment which will permit the use of small collets in standard machines designed only for the reception of relatively large collets is a distinct advantage in that it facilitates more convenient and economical operation of the machines carrying the collets and materially increases their output. The present invention is such a device. It is furthermore possible with my improved collet adapter to use a substantial number of relatively small collets in one machine even though the dimensions of the collets vary as to length and as to the diameters of the collet jaws used to grip or otherwise secure the stock to be worked.

Accordingly one of the objects of my invention is the provision of a simple collet adapter which can be conveniently and easily fitted into lathes and similar machines.

Another important object of the present invention is the provision of an attachment for lathes and similar machines which will substantially increase the usefulness of said machines and their output.

A further object of the invention resides in the provision of a device which will permit the retention by lathes or similar machines of stock of substantially varying diameters for shaping or otherwise processing by tools pressed against said stock.

An additional object of the invention is the provision of a collet adapter for use in lathes or similar machines whereby relatively small collets of varying lengths and jaw capacities may be used in lathes or similar machines normally adapted to function only with relatively large collets.

Another object of the present invention is the construction of a collet adapter of relatively movable parts cooperating with a draw-in member of a lathe or similar machine and adapted to contract the spring-actuated jaws of a small collet.

Another object of the invention is the provision of an attachment for lathes and similar machines which will make possible more convenient, economical and efficient operation of such machines.

A preferred embodiment of my invention whereby I attain the above and other and further objects is illustrated in the accompanying drawings wherein like numerals refer to like parts throughout the several views, and wherein:

Fig. 1 is a longitudinal view, partly in section, showing my adapter in its entirety and the manner in which a relatively small collet is held by said adapter;

Fig. 2 is a cross-section of the collet adapter and the small collet taken on the line 2—2 of Fig. 1;

Fig. 3 is a longitudinal view, partly in section, of the flared portion of my adapter;

Fig. 4 is a longitudinal view, partly in section, of the portion of my adapter which is threadably received by the draw-in member of a lathe or similar machine; and Figs. 5 and 6 are longitudinal views of large and small collets respectively.

In general my present invention comprises a collet adapter consisting of two relatively movable parts adapted to be inserted in a chuck or other holding member of a lathe or similar machine and a draw-in member such as an exteriorly and interiorly threaded nut rotatably positioned in the chuck or other holding member. The adapter is so constructed as to contract the spring-actuated jaws of a relatively small collet used to secure or grip stock to be processed. A small collet is inserted in the adapter and one end of the collet is threaded into one section of the adapter. The collet and the adapter sections are then drawn inwardly by any suitable power means. During this inward movement interior flanges on flared portions of the collet adapter compress the spring-actuated jaws of the small collet and the jaws seize or grip the stock to be worked. The retraction of the collet and the adapter sections is accomplished by rotation of the draw-in member into threaded engagement with a section of the collet adapter.

The parts of the chuck of a lathe equipped for reception of both large and small collets are indicated diagrammatically in Fig. 1 and as shown comprise the chuck proper 1 and a draw-in nut 2 rotatably positioned in said chuck, said draw-in nut being threaded for reception of a section 9 of my collet adapter hereinafter referred to. The draw-in nut 2 may be rotated by any suitable means. A conventional standard or large collet, such as is shown in Fig. 5, has a threaded portion 4 and a tapered portion 5, adapted to fit respectively a threaded portion of the draw-in nut 2 at 11 in Fig. 1 and the tapered section 6 of the chuck 1. Clamping jaws of large and small collets respectively, are shown at 7 in Figs. 5 and 6, said jaws being of the spring-actuated type.

My attachment is indicated in its entirety by the numeral 8 in Fig. 1 and consists of two parts 9 and 10. The part 9 is in the nature of a sleeve having an exteriorly threaded end 11 shown in Figs. 1 and 4 dimensioned the same as section 4 of the standard or large collet shown in Fig. 5. Interiorly the end 11 of the section 9 is threaded as at 12 and dimensioned to receive the threaded end 4a of a small collet such as is shown in Fig. 6. At the other end the sleeve section 9 is threaded exteriorly as at 15 and between the threaded section 15 and the adjacent portion of the central part of the sleeve 9, the latter is recessed as at 16. The section 10 of the collet adapter comprises a tapered part 18 corresponding to the tapered portion 5 of a large collet such as is shown in Fig. 5 except that it has no clamping jaws. Interiorly the tapered section 18 is flanged as at 19 to receive the tapered section of a small collet 5a such as is shown in Fig. 6. The other end of the adapter section 10 is provided with an inwardly projecting flange, which is threaded interiorly as at 21. By screwing the threaded section 21 over the threaded section 15 until the section 21 lies in the recess 16, the two sections 9 and 10 of the adapter are slidably connected together in such manner that one is adapted to move axially relative to the other but separation is prevented. The adapter section 9 is secured against rotation relative to the chuck 1 by means of a key (not shown in the drawing) positioned in the chuck 1, said key engaging in a keyway 22.

From an inspection of Figs. 1 and 6, it will be seen that by threading the section 4a of the small collet into the threaded portion 12 of the adapter section 9, the flared portion 5a of the small collet lies within the tapered section 19 of the adapter section 10. The assembled small collet and adapter therefore correspond in dimensions to a standard or large collet such as is shown in Fig. 5 and by inserting the combined small collet 5a and the adapter sections 9 and 10 in the chuck 1, the adapter section 9 may be brought into threaded engagement with the draw-in nut 2 by rotating the latter. By this rotation of the nut 2 the adapter section 9 and the small collet 5a are drawn inwardly relative to the tapered section 19 in the adapter section 10. The retraction of the adapter section 9 and of the small collet 5a forces inwardly the spring-actuated jaws of the small collet 5a as the flared section of said collet bears against the tapered section 19 of the adapter section 10, as a result of which the jaws of said collet grip or otherwise secure the stock to be worked. Construction of the collet adapter in two relatively movable parts 9 and 10 permits the use in said adapter of collets of varying lengths.

My collet adapter is especially suitable for use in small machine shops where by reason of the expense involved it is impractical and undesirable to maintain a large stock of collets capable of retaining or gripping stock presenting substantial ranges in sizes and dimensions. The adapter is highly efficient, of simple construction, easily fitted into a lathe or similar machine and makes possible material reductions in the operating expenses of shops using it.

Adaptations and modifications of the adapter will readily suggest themselves to those skilled in the art, and this without departing from the spirit and scope of my invention. Therefore, it is my desire to be limited herein only by the prior art and the appended claims.

I claim:

1. A collet adapter comprising a first, cylindrical portion having a flared head, a second cylindrical portion axially aligned with the first portion, an inwardly directed flange on one of said portions, an outwardly directed flange on the other said portion, complementary threads on said flanges, said flanges each being spaced a distance from its portion proper substantially greater than the width of the flange whereby relative axial motion of the portions is provided after mutual negotiation of the threaded portions, means on the second portion for engagement with a draw member, and means on the second portion for engaging a collet in fixed position with respect to the second portion.

2. A collet adapter comprising a first, cylindrical portion having a flared mouth with frusto-conical outer and inner surfaces, a second, cylindrical portion axially aligned with said first portion, external and internal threads on the end of said second portion remote from said first portion, an annular groove on the inside of one portion and the outside of the other portion, and means effecting mutual engagement of one end of each portion in the groove of the other, said grooves being of sufficient width to afford relative axial translation of the two portions.

3. The device of claim 2, the means effect mutual engagement of the two portions comprising complementary threads on the adjacent ends of the two portions.

4. In a device as in claim 3, a keyway longitudinally arranged on the said second portion.

5. The device of claim 2 said flared mouth having a continuous periphery.

6. A collet adapter comprising a first cylindrical portion with flared mouth a second cylindrical portion axially aligned with the first portion and threaded externally and internally on the end remote from the first portion, said portions being interengaged in a loose coupling affording substantial relative axial translation and a keyway on the second portion.

7. A collet adapter comprising a first portion having a flared mouth on one end, an internal thread on the other end, and an enlarged bore between the two ends, a second portion having on one end an external thread complementary to the internal thread on the first portion, a reduced annulus behind the said external thread, and external and internal threads on the other end, said enlarged bore and reduced annulus being sized to receive the said complementary threads, respectively for a substantial degree of sliding motion.

ERNEST HULL.

REFERENCES CITED

The following references are of record in the file of this patent:

UNITED STATES PATENTS

| Number    | Name          | Date           |
|-----------|---------------|----------------|
| 628,730   | Whitney et al.| July 11, 1899  |
| 1,535,048 | Schumer       | Apr. 21, 1925  |
| 1,729,483 | Kock          | Sept. 24, 1929 |
| 2,187,090 | Martin        | Jan. 16, 1940  |
| 2,210,092 | Miller        | Aug. 6, 1940   |

FOREIGN PATENTS

| Number  | Country | Date          |
|---------|---------|---------------|
| 159,067 | Germany | Mar. 13, 1905 |